(12) United States Patent
Saimaru et al.

(10) Patent No.: US 9,905,819 B2
(45) Date of Patent: Feb. 27, 2018

(54) PRISMATIC BATTERY

(71) Applicant: HITACHI AUTOMOTIVE SYSTEMS, LTD., Hitachinaka-shi, Ibaraki (JP)

(72) Inventors: Shou Saimaru, Hitachinaka (JP); Yukihiro Soga, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 28 days.

(21) Appl. No.: 15/029,825

(22) PCT Filed: Nov. 15, 2013

(86) PCT No.: PCT/JP2013/080888
§ 371 (c)(1),
(2) Date: Apr. 15, 2016

(87) PCT Pub. No.: WO2015/072010
PCT Pub. Date: May 21, 2015

(65) Prior Publication Data
US 2016/0254501 A1  Sep. 1, 2016

(51) Int. Cl.
*H01M 2/04* (2006.01)
*H01M 2/02* (2006.01)
(Continued)

(52) U.S. Cl.
CPC ........... *H01M 2/043* (2013.01); *B23K 26/206* (2013.01); *B23K 26/244* (2015.10); *B23K 26/28* (2013.01);
(Continued)

(58) Field of Classification Search
CPC . H01M 2/0426; H01M 2/0439; H01M 2/0473
See application file for complete search history.

(56) References Cited

U.S. PATENT DOCUMENTS

2010/0258538 A1  10/2010  Suzuki et al.
2013/0224566 A1   8/2013  Sakai et al.

FOREIGN PATENT DOCUMENTS

DE  102011077689 A1  12/2012
JP     2004-195490 A    7/2004
(Continued)

OTHER PUBLICATIONS

Gorscak et al., "Design Guidline #1, Designer's Guide for Laser Hermetic Sealing Introduction", Aug. 31, 1991, XP055136665, Libertyville, Illinois, USA.
(Continued)

*Primary Examiner* — Carlos Barcena
(74) *Attorney, Agent, or Firm* — Volpe and Koenig, P.C.

(57) ABSTRACT

A square battery includes a battery can surrounded by four side wall portions, and having an upper end portion on one side in a height direction of the side wall portions opened and a bottom portion in a lower end portion on the other side in the height direction, and a battery lid welded to the upper end portion to seal the battery can, wherein between the battery can and the battery lid, a lateral boundary surface in a lateral direction crossing the height direction of the side wall portions and a vertical boundary surface in a vertical direction crossing the lateral boundary surface and along the height direction of the side wall portions are formed, at least a part of the lateral and vertical boundary surfaces being welded by a laser radiated in the vertical direction along the height direction of the side wall portions.

3 Claims, 13 Drawing Sheets

(51) Int. Cl.
    *H01M 10/0525*  (2010.01)
    *H01M 10/0587*  (2010.01)
    *B23K 26/20*    (2014.01)
    *B23K 26/28*    (2014.01)
    *B23K 26/32*    (2014.01)
    *B23K 33/00*    (2006.01)
    *B23K 26/244*   (2014.01)
    *B23K 101/04*   (2006.01)
    *B23K 101/36*   (2006.01)

(52) U.S. Cl.
    CPC ............ *B23K 26/32* (2013.01); *B23K 33/004* (2013.01); *H01M 2/024* (2013.01); *H01M 2/0262* (2013.01); *H01M 2/0439* (2013.01); *H01M 2/0473* (2013.01); *H01M 10/0525* (2013.01); *H01M 10/0587* (2013.01); *B23K 2201/04* (2013.01); *B23K 2201/36* (2013.01); *H01M 2220/20* (2013.01)

(56) References Cited

FOREIGN PATENT DOCUMENTS

| | | |
|---|---|---|
| JP | 2004195490 A * | 7/2004 |
| JP | 2006-019089 A | 1/2006 |
| JP | 2009-146645 A | 7/2009 |
| JP | 2011-129266 A | 6/2011 |
| JP | 2011-181215 A | 9/2011 |
| JP | 2012-089311 A | 5/2012 |
| JP | 2012-186005 A | 9/2012 |
| JP | 2012200768 A | 10/2012 |
| JP | 2013-091085 A | 5/2013 |
| JP | 2013-127867 A | 6/2013 |
| WO | 2010/146700 A1 | 12/2010 |

OTHER PUBLICATIONS

Supplementary European Search Report in counterpart EP Application No. 13897582.6 dated Sep. 6, 2017.

* cited by examiner

PRISMATIC BATTERY

TECHNICAL FIELD

The present invention relates to a square battery including a rectangular solid-shaped battery can formed with an opening portion, a battery lid which seals the opening portion of the battery can, and a flat wound group located in a space defined by the battery can and the battery lid and having positive and negative electrode plates, and a manufacturing method thereof.

BACKGROUND ART

As an on-vehicle lithium ion battery, a cylindrical or square sealed type battery is used. While many cylindrical batteries had been used, more square batteries have been used in these days in view of improvement in a mounting density for vehicle use. A square battery and a battery pack including a plurality of square batteries combined are demanded to be small-sized and light-weighted and many attempts have been accordingly made to reduce a plate thickness of a battery can.

Many of square batteries use a metallic battery can of a rectangular solid shape whose opening portion has a larger depth dimension than a shorter side dimension obtained by deep drawing or the like. In the rectangular solid-shaped battery can, a flat wound group is housed with an insulation sheet provided therebetween.

The flat wound group includes a positive electrode plate and a negative electrode plate each having a current collecting foil overlapped and wound or a plurality of them laminated alternately, in which at both ends, a part not coated with a positive electrode active material mixture and a part not coated with a negative electrode active material mixture are separately arranged. To each of the uncoated parts, a pole plate is joined by ultrasonic bonding or the like. The opening portion of the battery can is sealed by a metallic battery lid. To the battery lid, a positive electrode terminal and a negative electrode terminal for the connection with an external load are fixed via a gasket for providing electrical insulation from the battery lid and maintaining airtightness of the inside of the battery. The battery lid is welded to the battery can by laser beam welding or the like to seal the opening portion of the battery can.

In a square battery of PTL 1, a battery can and a battery lid are fillet welded by laser to configure a battery container. Specifically, the battery lid is provided with a fit-in portion to be fit in an opening portion of the battery can, and a flange portion in contact with an upper end surface of the opening portion of the battery can, and with the fit-in portion fit in the opening portion, the battery lid is fixed by fillet welding the flange portion to the upper end surface of the opening portion of the battery can on both sides of the wide side surface and the narrow side surface.

CITATION LIST

Patent Literature

PTL 1: Japanese Patent Application Laid-Open No. 2011-181215

SUMMARY OF INVENTION

Technical Problem

In a case of the structure of PTL 1, the battery container is configured by fillet welding the battery can and the battery lid by laser. Specifically, since the battery container is fillet welded within a range of a plate thickness of the battery can, as the plate thickness of the battery container is reduced, a welding allowable range will be narrowed. Additionally, when the battery lid is welded beyond the range of the plate thickness of the battery can due to variation in precision of a part, a welded range is narrowed. Therefore, it might be difficult to ensure a predetermined welding strength.

The present invention is made in view of the above aspects and aims at providing a square battery in which a welding portion that welds a space between a battery can and a battery lid is allowed to ensure a prescribed welding strength.

Solution to Problem

In order to solve the above issue, a square battery of the present invention includes a battery can surrounded by four side wall portions, and having an upper end portion on one side in a height direction of the side wall portions opened and having a bottom portion in a lower end portion on the other side in the height direction, and a battery lid welded to the upper end portion of the battery can to seal the battery can, wherein between the battery can and the battery lid, a lateral boundary surface in a lateral direction crossing the height direction of the side wall portions and a vertical boundary surface in a vertical direction crossing the lateral boundary surface and along the height direction of the side wall portions are formed, at least a part of the lateral boundary surface and at least a part of the vertical boundary surface being welded by a laser radiated in the vertical direction along the height direction of the side wall portions.

Advantageous Effects of Invention

According to the present invention, a prescribed welding strength can be ensured with ease.

Other problems, configurations and effects than those described above will be clarified from the following description of embodiments.

DESCRIPTION OF EMBODIMENTS

In the following, each embodiment of a square battery of the present invention will be described in detail with reference to the drawings.

First Embodiment

Figure 1:
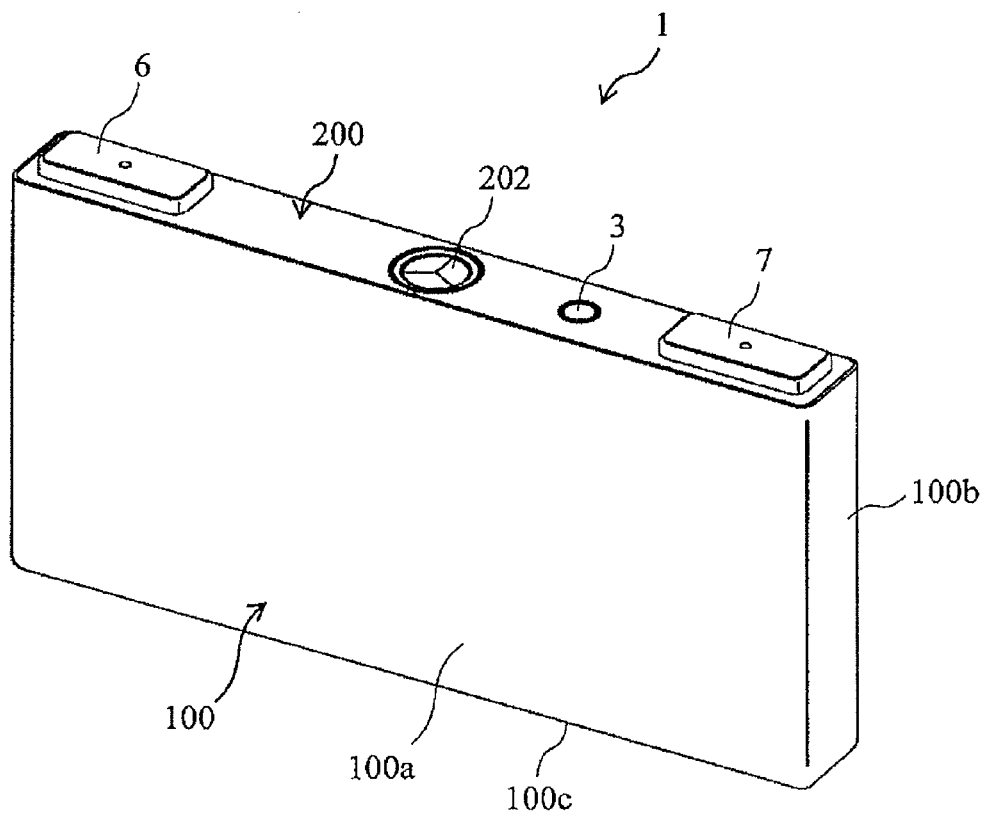
FIG. 1 is an external perspective view of a square battery.
Figure 2:
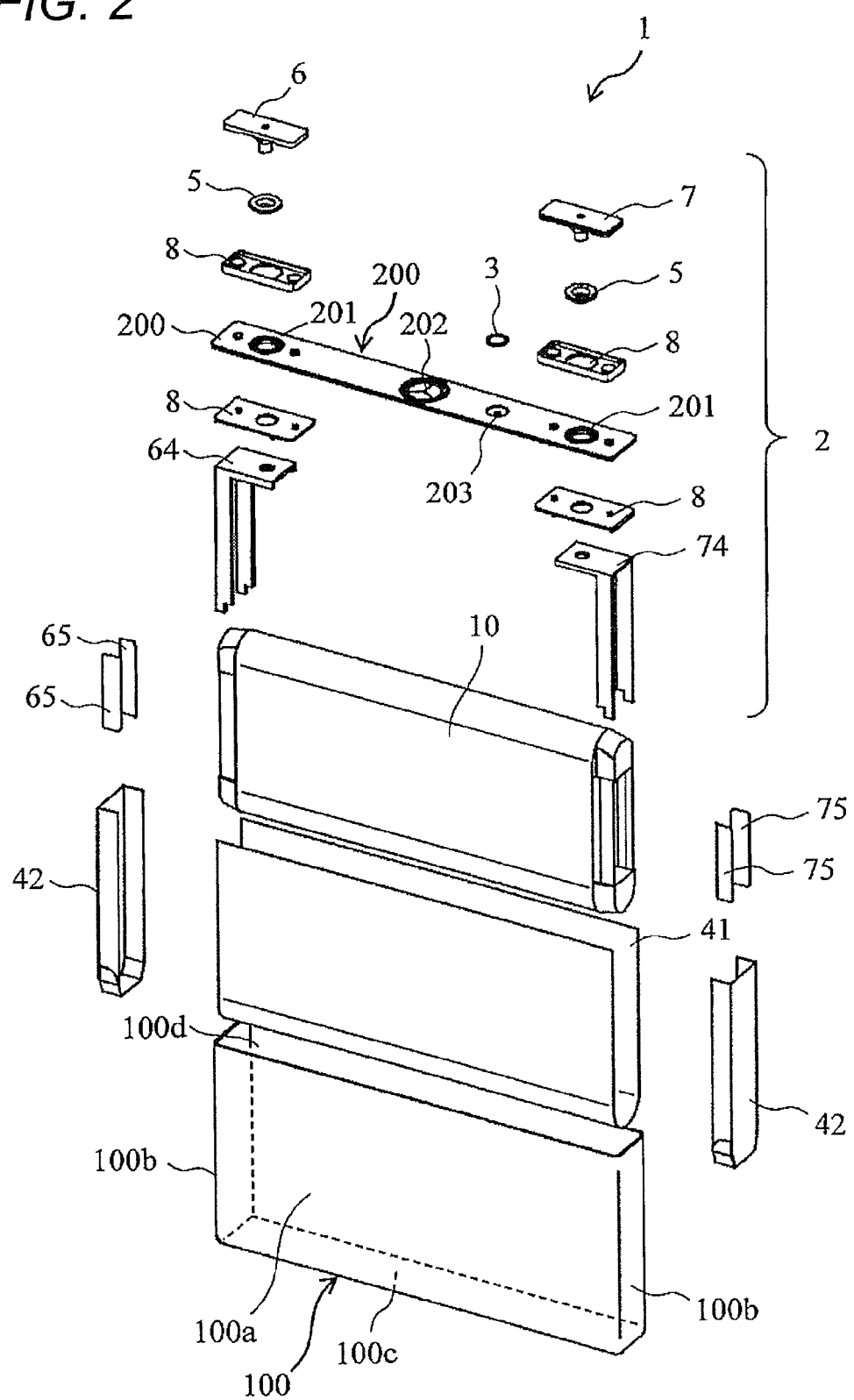
FIG. 2 is an exploded perspective view of the square battery illustrated in FIG. 1.

FIG. 1 is an external perspective view of a square battery as one embodiment of the square battery according to the present invention, and FIG. 2 is an exploded perspective view of the square battery illustrated in FIG. 1.

A square battery 1 is a high capacity lithium ion secondary battery to be mounted on an electric vehicle (EV), a hybrid vehicle or the like as, for example, a battery pack combining a plurality of square batteries 1, which battery has a configuration in which a sealed flat wound group and nonaqueous electrolyte are housed in a flat square battery container.

As illustrated in FIG. 1, the square battery 1 includes a square battery container configured with a battery can 100 and a battery lid 200. Materials of the battery can 100 and the battery lid 200 are, for example, aluminum or aluminum-based metal such as an aluminum alloy. The battery can 100 has a pair of wide side wall portions 100a, a pair of narrow side wall portions 100b and a bottom portion 100c, and is formed in a rectangular box-shape with an upper surface opened. Specifically, as illustrated in FIG. 2, the battery can 100 has a shape surrounded by four side wall portions, and having an upper end portion on one side in a height direction of the side wall portions opened by an opening portion 100d and having the bottom portion 100c in a lower end portion on the other side in the height direction.

While in the present embodiment, with a direction between the bottom portion 100c and the opening portion 100d assumed to be an up-down height direction, the bottom portion 100c side is set to be a bottom side and the opening portion 100d side is set to be a top side, and a direction crossing the height direction is set to be a right and left lateral direction for explanation's sake, these are directions used for convenience's sake for explaining a configuration of the square battery 1, but do not represent a vertical direction or a horizontal direction.

The battery can 100 has the pair of wide side wall portions 100a extending upward from a pair of longer sides of the rectangular bottom portion 100c, and the pair of narrow side wall portions 100b extending upward from a pair of shorter sides of the bottom portion 100c. These pairs of wide side wall portions 100a and pairs of narrow side wall portions 100b are continuous with each other via chamfers having a predetermined curved-shape and extend up and down while having a shape of a constant closed cross section. The pair of wide side wall portions 100a and the pair of narrow side wall portions 100b of the battery can 100 have a generally constant plate thickness and extend from the bottom portion 100c to a position of the same height. The opening portion 100d of the battery can 100 is opened upward of the battery can 100 so as to have a generally rectangular shape in a plane view which extends in a direction orthogonal to the wide side wall portions 100a and the narrow side wall portions 100b.

The battery lid 200 is configured with a rectangular flat plate member having a size that blocks the opening portion 100d of the battery can 100. With the battery lid 200 being in contact with the upper end portion of the battery can 100, the battery lid 200 is laser welded to the battery can 100 to seal the opening portion 100d of the battery can 100.

In the battery lid 200, a positive electrode terminal 6 and a negative electrode terminal 7 are disposed. The positive electrode terminal 6 and the negative electrode terminal 7 are provided at positions apart from each other in a longer side direction of the battery lid 200. The positive electrode terminal 6 and the negative electrode terminal 7 each have an upper surface extending in parallel along an upper surface of the battery lid 200, the upper surface of which forms a bus bar welding surface which enables welding of a bus bar.

The battery lid 200 is provided with a gas discharge valve 202. The gas discharge valve 202 is formed by partly thinning the battery lid 200 by, for example, press processing. The gas discharge valve 202 is formed with a cleaved groove so as to form a large opening when cleaved. When gas is generated in the square battery due to abnormal heat generation caused by overcharging or the like, thereby increasing a pressure within a battery container to reach a predetermined pressure to cleave, the gas discharge valve 202 reduces the pressure within the battery container by discharging the gas from the inside.

As illustrated in FIG. 2, a flat wound group 10 is housed in the battery can 100.

The flat wound group 10 is housed in the battery can 100 so as to be covered with insulation cases 41 and 42 formed of three parts. A material of the insulation cases 41 and 42 is a resin having insulating properties such as polypropylene. This electrically insulates the battery can 100 from the flat wound group 10.

A positive electrode 62 (see FIG. 3) of the flat wound group 10 is electrically connected to the positive electrode terminal 6 via a positive electrode current collector 64, and a negative electrode 72 of the flat wound group 10 is electrically connected to the negative electrode terminal 7 via a negative electrode current collector 74. As a result, power is supplied to an external load from the flat wound group 10 through the positive electrode terminal 6 and the negative electrode terminal 7, or externally generated power is supplied to the flat wound group 10 to be charged through the positive electrode terminal 6 and the negative electrode terminal 7.

A battery lid assembly 2 includes the battery lid 200, the positive electrode terminal 6 and the negative electrode terminal 7 attached to a pair of through holes 201, respectively, provided in the battery lid 200, the positive electrode current collector 64 and the negative electrode current collector 74, a pair of gaskets 5, and a pair of insulation members 8 on upper and lower surfaces of the battery lid 200.

The battery lid assembly 2 is fixed, with an inner surface side and an outer surface side of the battery container defined by staking the respective positive electrode terminal 6 and negative electrode terminal 7 to compress the gasket 5. Here, a material of the positive electrode terminal 6 and the positive electrode current collector 64 is aluminum-based metal, for example, aluminum or an aluminum alloy. A material of the negative electrode terminal 7 and the negative electrode current collector 74 is copper or a copper alloy. A material of the insulation member 8 and the gasket 5 is a resin having insulating properties such as polybutylene terephthalate, polyphenylene sulfide or a perfluoroalkoxy fluororesin.

The battery lid 200 is provided with a liquid inlet 203. In the square battery 1, the flat wound group 10 is housed in the battery can 100, and after blocking the opening portion 100d of the battery can 100 by the battery lid 200 and joining the battery lid 200 to the battery can 100 by welding, an electrolyte is injected into the battery can 100 from the liquid inlet 203. As an electrolyte, for example, a nonaqueous electrolyte can be used in which a lithium salt such as hexafluorophosphate lithium (LiPF$_6$) is dissolved in a carbonic ester-based, such as ethylene carbonate, organic solvent. After the electrolyte is injected into the battery can 100, the liquid inlet 203 is sealed by a sealing stopper 3. The sealing stopper 3 is welded to the battery lid 200 to seal the liquid inlet 203.

The liquid inlet 203 is formed to extend through a thickness direction of the battery lid 200 and on the upper surface side of the battery lid 200, a circular-shaped annular recessed portion is provided concentrically along an outer circumference of the liquid inlet 203. The annular recessed portion is provided on the upper surface side (outside of the battery container) of the battery lid 200 which forms one side surface of the battery container, so as to be recessed toward the inside of the battery container and is formed by counterboring processing. The sealing stopper 3 has a disc-shape and after a liquid injection process, is fit in the liquid inlet 203 and hermetically sealed by laser welding. The sealing stopper 3 is formed of, for example, aluminum or aluminum-based metal such as an aluminum alloy.

Figure 3:
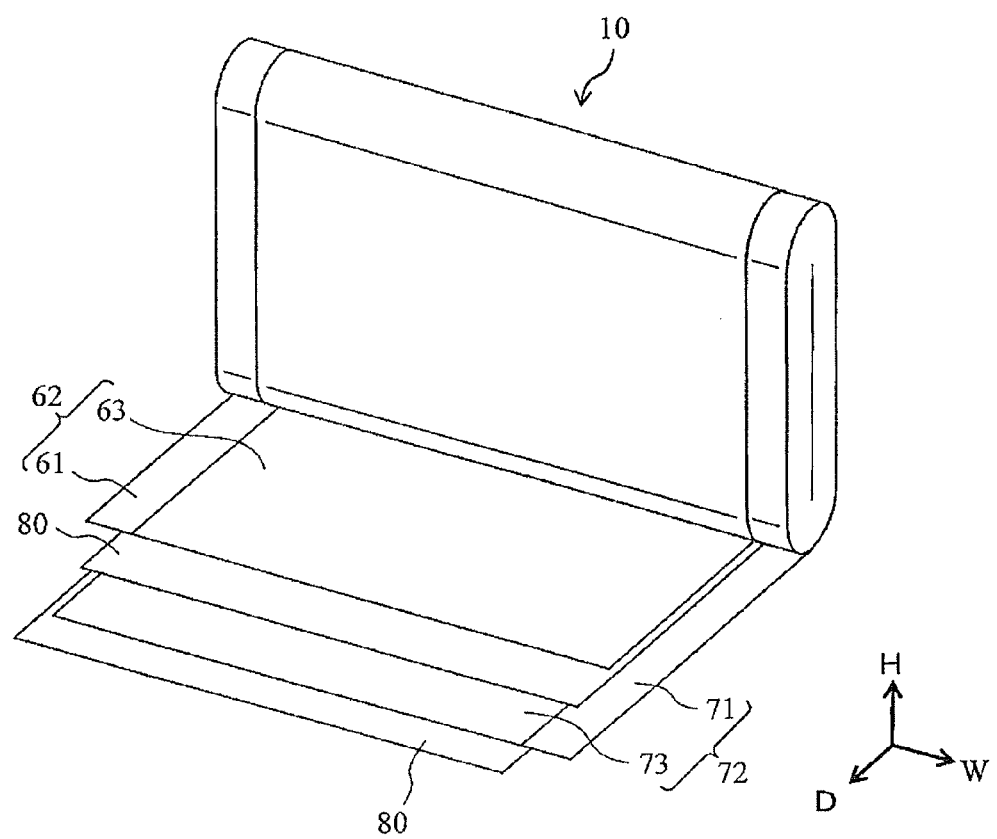
FIG. 3 is a perspective view showing a state where a part of a flat wound group is exploded.

With reference to FIG. 3, the flat wound group 10 will be described. FIG. 3 is a perspective view showing a state where a winding termination side of the flat wound group 10 shown in FIG. 2 is exploded.

As illustrated in FIG. 3, the flat wound group 10, which is also a power storage element, has a layered structure where the elongated positive electrode 62 and negative electrode 72 are wound around a winding axis W so as to have a flat-shape, with a separator 80 provided therebetween. Specifically, the flat wound group 10 is a flat-shaped wound electrode group having curved surface portions with semicircular cross sections formed at both ends thereof and a flat surface portion which is substantially flat between both the curved surface portions.

The positive electrode 62 has a positive electrode foil 61, and a positive electrode active material mixture layer 63 formed by applying, to both surfaces of the positive electrode foil 61, a positive electrode active material mixture including a binding material (binder) mixed with the positive electrode active material. The negative electrode 72 has a negative electrode foil 71, and a negative electrode active material mixture layer 73 formed by applying, to both surfaces of the negative electrode foil 71, a negative electrode active material mixture including a binding material (binder) mixed with a negative active material. Between the positive electrode active material and the negative electrode active material, charging and discharging are performed.

The positive electrode foil 61 is an aluminum alloy foil having a thickness of approximately 20 to 30 μm and the negative electrode foil 71 is a copper alloy foil having a thickness of approximately 15 to 20 μm. A material of the separator 80 is a porous polyethylene resin. The positive electrode active material is a lithium-containing transition metal double oxide such as lithium manganate and the negative electrode active material is a carbon material such as carbon black that is capable of reversibly absorbing and discharging lithium ions.

Of both end portions of the flat wound group 10 in a width direction (a direction of the winding axis W orthogonal to a winding direction), one end portion is assumed to be a part in which an uncoated part (an exposed portion of the positive electrode foil 61) not having the positive electrode active material mixture layer 63 formed is laminated. Additionally, the other end portion is assumed to be a part in which an uncoated part (an exposed portion of the negative electrode foil 71) not having the negative electrode active material mixture layer 73 formed is laminated. The laminated body of the positive side uncoated part and the laminated body of the negative side uncoated part are respectively crushed in a thickness direction of the flat wound group 10 (a direction indicted by an arrow D in FIG. 3) in advance and are connected by ultrasonic joining between the positive electrode current collector 64 and a positive electrode current collection protective foil 65, and between the negative electrode current collector 74 and a negative electrode current collection protective foil 75 of the battery lid assembly 2 (see FIG. 2), respectively.

Figure 4A:
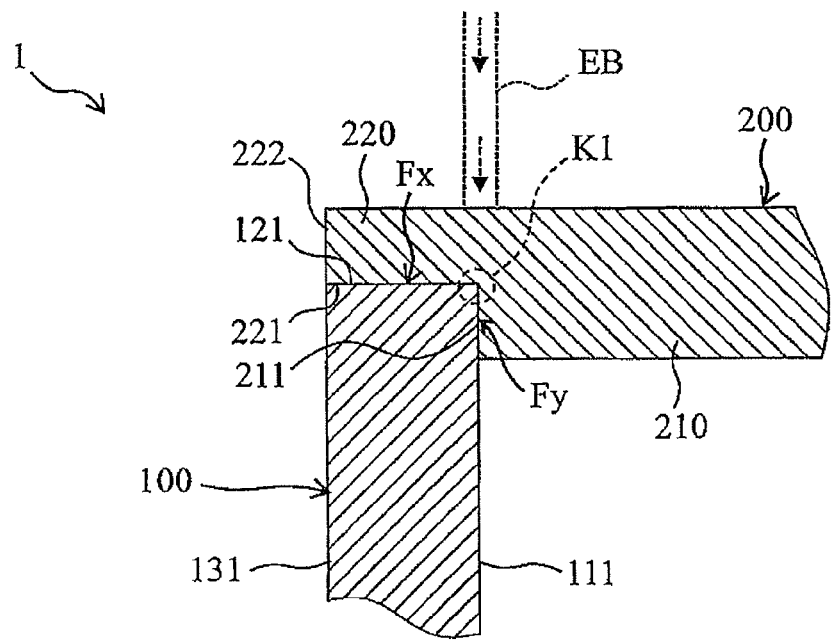
FIG. 4A is a sectional view showing a structure example of a joining portion between a battery can and a battery lid in a first embodiment, which shows a cross section before welding.
Figure 4B:
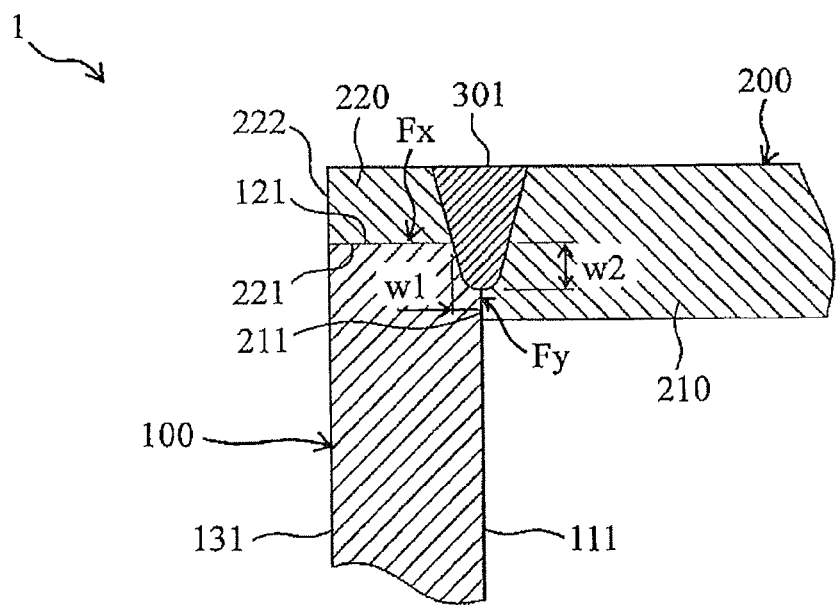
FIG. 4B is a sectional view showing a structure example of the joining portion between the battery can and the battery lid in the first embodiment, which shows a cross section after welding.

FIG. 4A and FIG. 4B are sectional views each showing a structure example of a joining portion between the battery can and the battery lid in the present embodiment, FIG. 4A being a view showing a cross section before welding and FIG. 4B being a view showing a cross section after welding.

The battery can 100 has an upper end surface 121 in a lateral direction crossing a height direction of the side wall portion, which surface is provided at the upper end portion of the battery can 100, and an inner wall surface 111 and an outer wall surface 131 in a vertical direction along the height direction of the side wall portion, the both surfaces being provided inside and outside of the battery can 100.

The battery lid 200 has a flange portion 220 provided along an outer circumference portion, and a lower projection portion 210 formed in an inner portion excluding the outer circumference portion. The lower projection portion 210 protrudes more toward the battery can 100 side than the flange portion 220 and has a size that allows fitting into the opening portion 100d of the battery can 100. The battery lid 200 is formed to have a thickness of the flange portion 220 smaller than a thickness of the lower projection portion 210 and has a lid stepped surface 211 formed between the flange portion 220 and the lower projection portion 210. The lid stepped surface 211 has a height which is a difference between the thickness of the flange portion 220 and the thickness of the lower projection portion 210.

As a result of mounting of the battery lid 200 on the battery can 100, the lower projection portion 210 is fit in the opening portion 100d of the battery can 100. Then, a lower surface (first opposed surface) 221 of the flange portion 220 comes into contact with the upper end surface 121 of the battery can 100 and the lid stepped surface (second opposed surface) 211 of the battery lid 200 is arranged to be opposed to the inner wall surface 111 of the battery can 100.

Therefore, between the upper end surface 121 of the battery can 100 and the lower surface 221 of the flange portion 220 of the battery lid 200, a lateral boundary surface Fx in the lateral direction perpendicular to the height direction of the side wall portion of the battery can 100 is formed and between the inner wall surface 111 of the battery can 100 and the lid stepped surface 211 of the battery lid 200, a vertical boundary surface Fy in the vertical direction orthogonal to the lateral boundary surface Fx and along the height direction of the side wall portion of the battery can 100 is formed. Specifically, the battery lid 200 has the first opposed surface (lower surface 221) forming the lateral boundary surface Fx to be opposed to the upper end surface of the battery can 100, and the second opposed surface (the lid stepped surface 211) orthogonal to the first opposed surface and forming the vertical boundary surface Fy opposed to the inner wall surface of the battery can 100. The lateral boundary surface Fx and the vertical boundary surface Fy are orthogonal to each other to have an L-shaped cross section crossing at a corner K1 and continuously formed along the outer circumference of the battery lid 200 over the entire circumference. The lateral boundary surface Fx may not be completely perpendicular to the height direction of the side wall portion, and the lateral boundary surface Fx and the vertical boundary surface Fy may not be completely orthogonal to each other.

The battery lid 200 is welded to the battery can 100 by laser EB to hermetically seal the opening portion 100d. As illustrated in FIG. 4A, the laser EB is radiated from above the battery lid 200 in the vertical direction along the height direction of the side wall portion of the battery can 100 to weld at least a part of the lateral boundary surface Fx and at least a part of the vertical boundary surface Fy.

The laser EB is radiated from above the battery lid 200 toward a position immediately above the corner K1, the position being located at an inner side from an outer circumference end surface 222 by a predetermined distance. Then, a welding portion 301 is formed which welds a space between the battery lid 200 and the battery can 100 by simultaneously melting both a depth direction along an irradiation direction of the laser EB and a width direction crossing the irradiation direction. The laser EB is radiated with respect to the outer wall surface 131 of the battery can 100.

The welding portion 301 is provided to include the corner K1 at which the lateral boundary surface Fx and the vertical boundary surface Fy intersect, thereby hermetically sealing the space between the battery can 100 and the battery lid 200. The welding portion 301 is formed by melting to a position deeper than a thickness of the flange portion 220 from the upper surface of the battery lid 200 to join the lateral boundary surface Fx by a welding width w1 and join a second boundary surface portion F2 by a welding height w2. Specifically, the lateral boundary surface Fx is partly welded by the prescribed welding width w1 from the corner K1 at which the lateral boundary surface Fx and the vertical boundary surface Fy cross and the vertical boundary surface Fy is partly welded by the prescribed welding depth w2 from the corner K1. The welding portion 301 is continuously provided along the vertical boundary surface Fy over the entire circumference.

According to the square battery 1, since both the lateral boundary surface Fx and the vertical boundary surface Fy are welded, as compared with a case where only either one of the lateral boundary surface Fx and the vertical boundary surface Fy is welded, both a force exerted on the height direction and a force exerted on the lateral direction can be resisted to obtain a high welding strength.

In particular, although due to an increase in an internal pressure or the like, the square battery 1 is deformed in a direction where the battery container expands, thereby exerting a force in a direction in which the flange portion 220 of the battery lid 200 is removed from the upper end surface 121 of the battery can 100, i.e., a force in a tensile direction in which the lateral boundary surface Fx is removed, the welding portion 301 welds, in addition to the lateral boundary surface Fx, the vertical boundary surface Fy extending in a direction orthogonal to the lateral boundary surface Fx. Therefore, a force in a shearing direction can be exerted between the lid stepped surface 211 of the battery lid 200 and the inner wall surface 111 of the battery can 100 to resist the force in the direction in which the battery lid 200 is removed, thereby obtaining a high welding strength. As a result, a stable welding strength can be obtained to achieve an effect of suppressing variation of the welding strength.

Figure 5A:
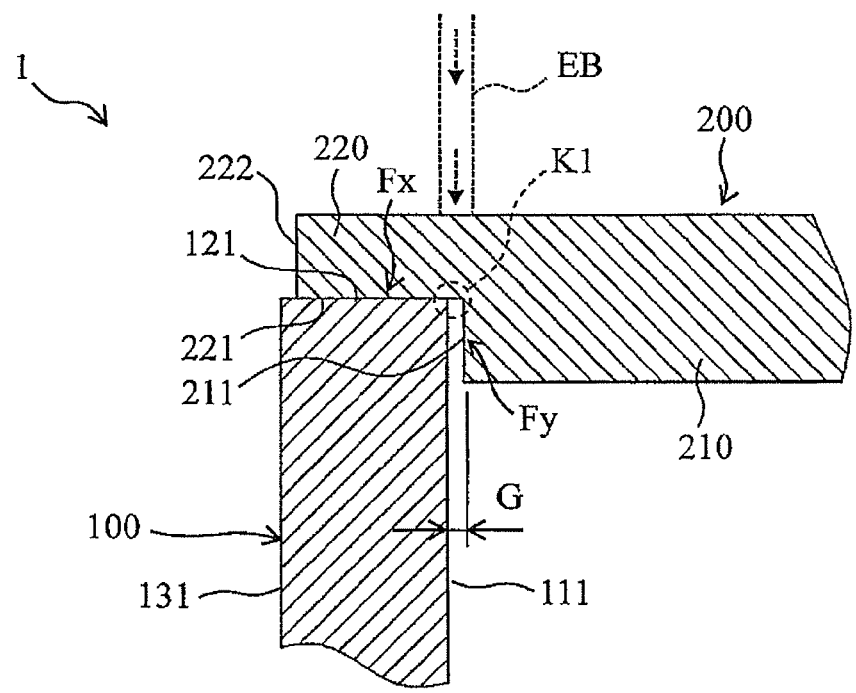
FIG. 5A is a sectional view showing a case where a gap exists between an opening portion of the battery can and an engagement portion of the battery lid illustrated in FIG. 4A and FIG. 4B, which shows a cross section before welding.
Figure 5B:
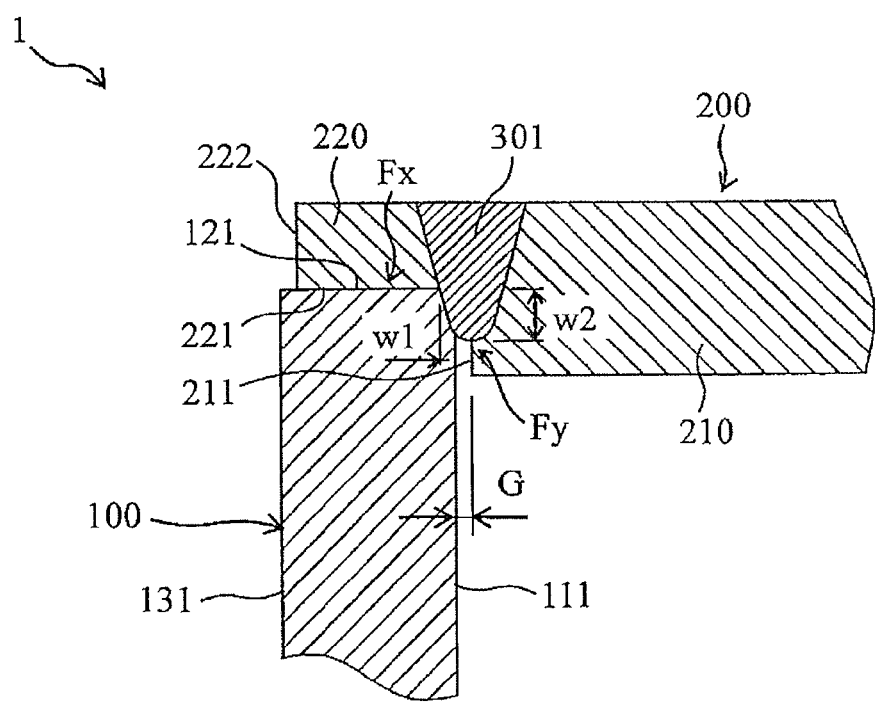
FIG. 5B is a sectional view showing a case where a gap exists between the opening portion of the battery can and the engagement portion of the battery lid illustrated in FIG. 4A and FIG. 4B, which shows a cross section after welding.

FIG. 5A and FIG. 5B are sectional views showing cases where a gap exists between the opening portion of the battery can and the engagement portion of the battery lid illustrated in FIG. 4A and FIG. 4B, respectively, FIG. 5A being a view showing a cross section before welding and FIG. 5B being a view showing a cross section after welding.

Each component of the square battery 1 in general has a dimension tolerance and in particular, when assembling mass-produced articles, as illustrated in FIG. 5A, a gap G might be locally generated between the inner wall surface 111 of the battery can 100 and the lid stepped surface 211 of the battery lid 200. Even in such a case, by radiating a laser EB toward the corner K1 from above the battery lid 200, the welding portion 301 can be formed.

The welding portion 301 is provided at the corner K1 at which the lateral boundary surface Fx and the vertical boundary surface Fy intersect, thereby hermetically sealing the space between the battery can 100 and the battery lid 200. As illustrated in FIG. 5B, the welding portion 301, even when the gap G is generated, enables the lateral boundary surface Fx to be joined by the welding width w1 and the second boundary surface portion F2 to be joined by the welding height w2.

Therefore, as compared with a case where only either one of the lateral boundary surface Fx and the vertical boundary surface Fy is welded, both a force exerted on the height direction and a force exerted on the lateral direction can be resisted to obtain a high welding strength. Therefore, without being influenced by the gap G generated between the battery can 100 and the battery lid 200, a stable welding strength can be obtained to achieve an effect of suppressing variation of the welding strength.

In the square battery 1, the laser EB is radiated from above the battery can 100 to melt the welding portion 301 so as to extend through in the thickness direction of the battery lid 200 up to the battery can 100, thereby joining both the lateral boundary surface Fx and the vertical boundary surface Fy. As the battery can 100 is a thin press-molded article, the upper end portion of the battery can 110 has low rigidity to be liable to cause a dimension and a shape of the opening portion 100d to vary.

Therefore, when welding the space between the battery can 100 and the battery lid 200 by the irradiation of the laser from the side of the battery can 100, a laser focal distance is liable to deviate, so that high-level control for adjusting the focal distance is required to make manufacturing of the product difficult. Additionally, when welding the space between the battery can 100 and the battery lid 200 by the irradiation of the laser from the side of the battery can 100, the welding portion might protrude to the side of the outer wall surface 131 of the battery can 100, so that it is concerned that when a plurality of the batteries are arranged to be a battery pack, the welding portions interfere with each other to affect arrangement.

On the other hand, since the laser EB is radiated from above the battery lid 200, the focal distance is not liable to deviate, so that the square battery 1 of the present embodiment has an effect that welding is easy to obtain a constant welding quality, thereby facilitating manufacturing. Additionally, since it is possible to prevent the welding portion 301 from protruding from the side of the outer wall surface 131 of the battery can 100, when the battery is assembled as a battery pack, excellent assembling performance is obtained.

In the square battery 1, the laser EB is radiated for welding with respect to the outer wall surface 131 of the battery can 100. The laser EB is radiated, while being continuously moved over the entire outer circumference of the battery lid 200, to a position inward by a plate thickness of the battery can 100 from the outer wall surface 131 of the battery can 100.

As illustrated in FIG. 5A and FIG. 5B, since the battery lid 200 might go out of position in the lateral direction due to the dimension tolerance, when the laser EB is radiated with respect to the outer circumference end surface 222 of the battery lid 200, the corner K1 cannot be precisely seized due to the dimension tolerance, so that both of the lateral boundary surface Fx and the vertical boundary surface Fy might not be welded simultaneously.

By contrast, since in the square battery 1 of the present embodiment, the laser EB is radiated with respect to the outer wall surface 131 of the battery can 100, the corner K1 can be precisely seized by setting the width of the laser EB taking the dimension tolerance into consideration, thereby enabling simultaneous welding of both the lateral boundary surface Fx and the vertical boundary surface Fy.

In the square battery 1, the welding height w2 of the welding portion 301 on the vertical boundary surface Fy is smaller than the lid stepped surface 211 of the battery lid 200 to have, below the welding portion 301, a part in which the inner wall surface 111 of the battery can 100 and the lid stepped surface 211 of the battery lid 200 are opposed to each other. Therefore, spatters generated at the time of laser EB irradiation can be caught by the opposed part to prevent the spatters from entering the inside of the battery container.

Figure 13:
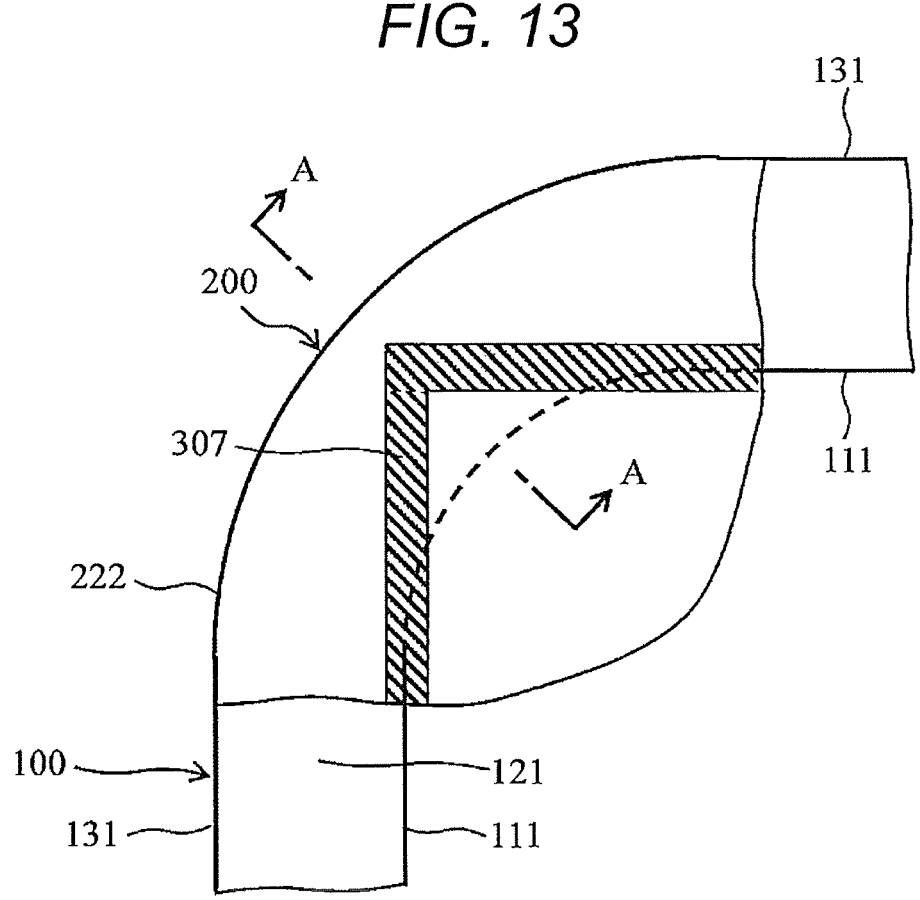
FIG. 13 is a plan view showing another structure example of the joining portion between the battery can and the battery lid in the first embodiment.
Figure 14:
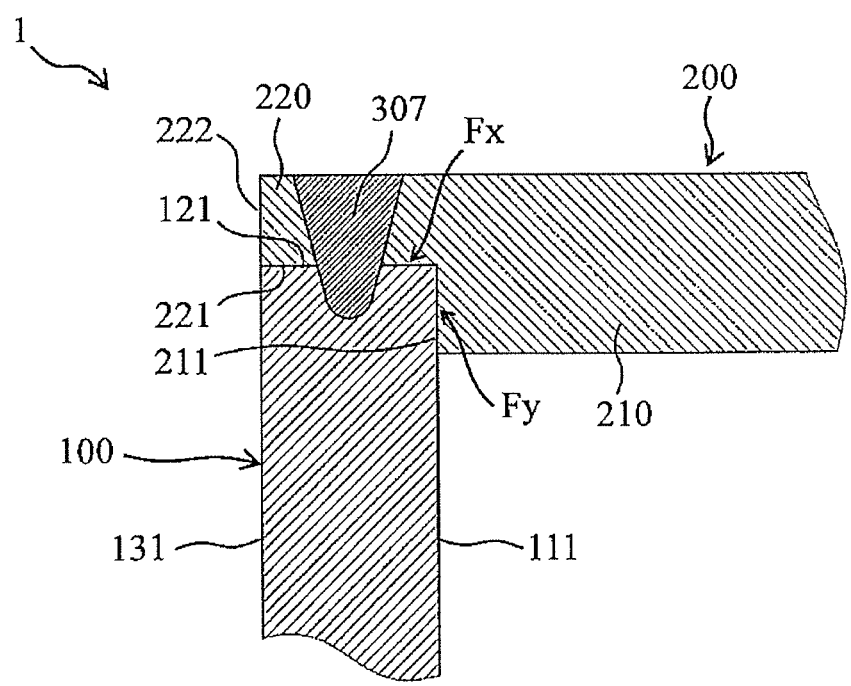
FIG. 14 is a sectional view taken along line A-A in FIG. 13.

FIG. 13 is a plan view showing another structure example of the joining portion between the battery can and the battery lid in the first embodiment and FIG. 14 is a sectional view taken along line A-A in FIG. 13.

While the above description has been made of a case where the welding portion 301 is continuously provided along the vertical boundary surface Fy over the entire circumference, since the battery can 100 has high rigidity at a corner portion between the wide side wall portion 100a and the narrow side wall portion 100b of the battery can 100 to expand and deform little, the welding portion 301 may not be provided along the vertical boundary surface Fy, and for example, at the corner portion of the battery can 100, only the lateral boundary surface Fx may be welded by a welding portion 307. In such a configuration, it is not necessary to radiate the laser EB along an R-shaped corner portion, so that its locus can be simple rectangular to simplify control of an irradiation position to which the laser EB is radiated.

Second Embodiment

Figure 6A:
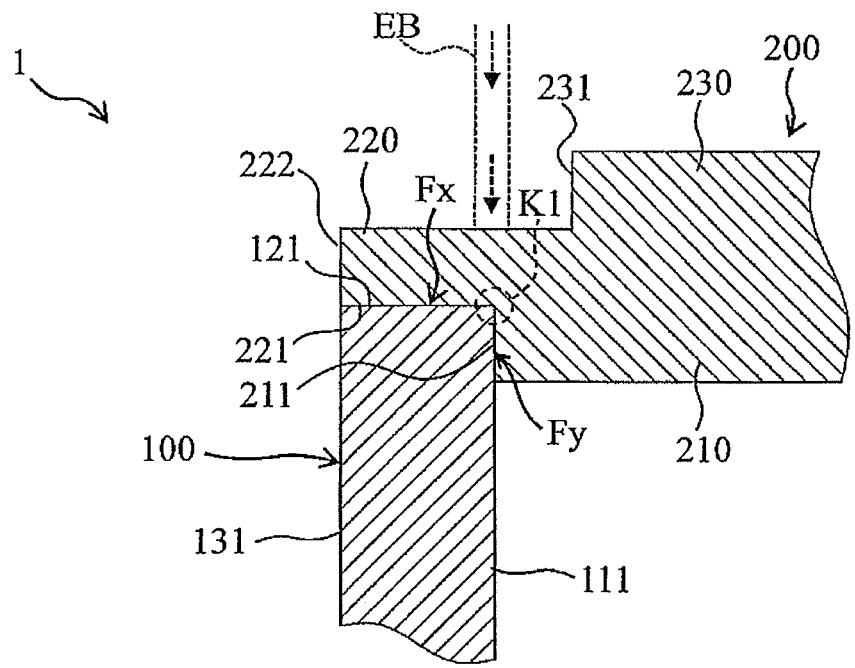
FIG. 6A is a sectional view showing a structure example of a joining portion between a battery can and a battery lid in a second embodiment, which shows a cross section before welding.
Figure 6B:
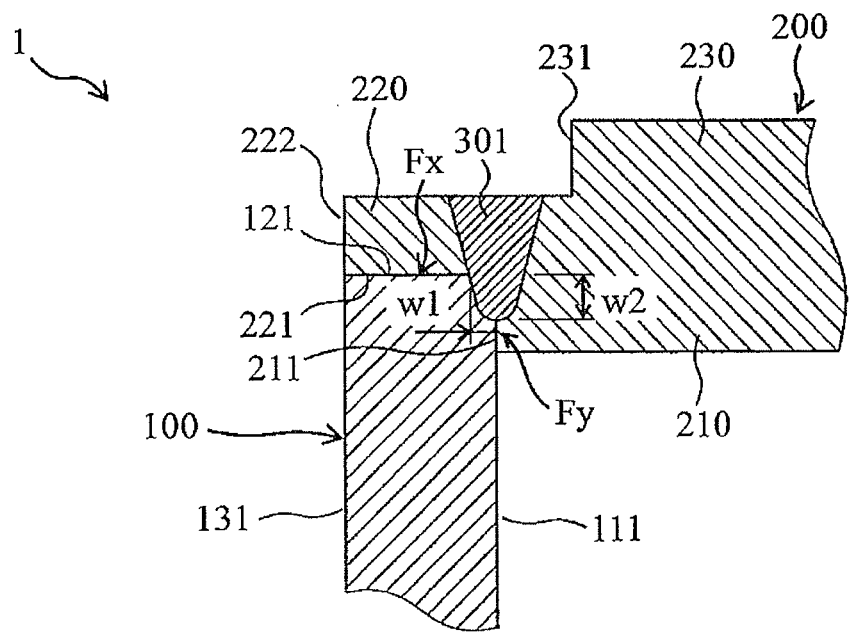
FIG. 6B is a sectional view showing a structure example of the joining portion between the battery can and the battery lid in the second embodiment, which shows a cross section after welding.

Next, a second embodiment of a square battery of the present invention will be described with reference to FIG. 6A and FIG. 6B. FIG. 6A and FIG. 6B are sectional views showing a structure example of a joining portion between a battery can and a battery lid in the second embodiment, FIG. 6A showing a cross section before welding and FIG. 6B showing a cross section after welding. The same components as those of the first embodiment are indicated by the same reference numerals to omit detailed description thereof.

The present embodiment is characterized in that an upper projection portion 230 is provided on the upper surface of a battery lid 200. The upper projection portion 230 is integrally formed when press-molding the battery lid 200. The upper projection portion 230 protrudes in the thickness direction of the battery lid 200 rather than a flange portion 220 and toward a side separating from a battery can 100 and has a stepped surface 231 between the upper projection portion 230 and the flange portion 220.

The stepped surface 231 is arranged at an inner side of the battery lid 200 than the lid stepped surface 211 between a lower projection portion 210 and the flange portion 220, i.e., on the side separating from the outer circumference end surface 222 with the lid stepped surface 211 provided therebetween. Therefore, a thickness of a part of the battery lid 200 irradiated with a laser EB can be reduced, resulting in enabling output of the laser EB to be reduced to save more energy.

By providing the upper projection portion 230 on the upper surface thereof, the battery lid 200 is allowed to have a protrusion height of the lower projection portion 210 to be reduced correspondingly. Therefore, when an opening portion 100d of the battery can 100 is blocked, a larger internal capacity of the battery container can be ensured and a flat wound group 10 can be increased in size by the increased capacity to enable an increase in a battery capacity. Additionally, a reduction in the protrusion height of the lower projection portion 210 prevents reduction in the rigidity of the battery lid 200, which leads to an increase in the strength of the battery lid 200.

Third Embodiment

Figure 7A:
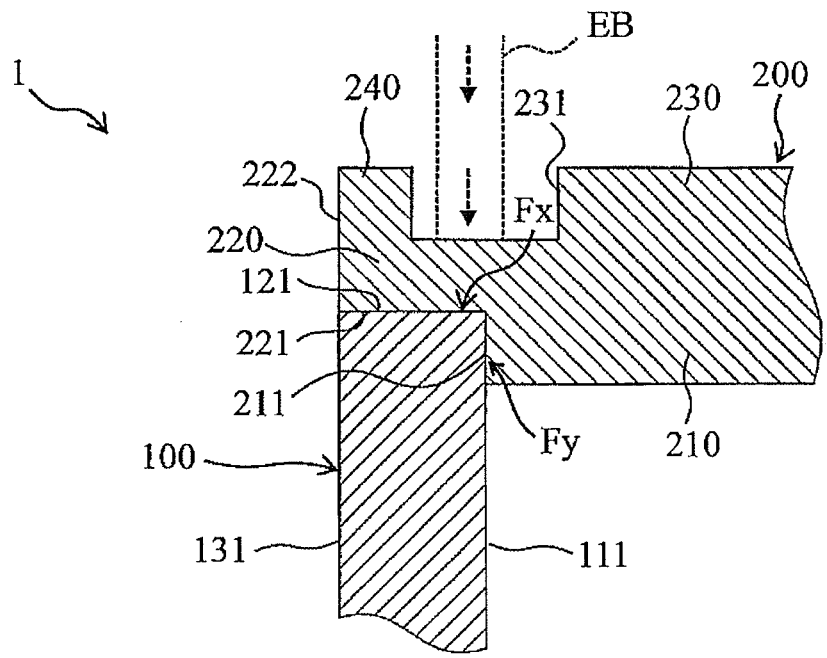
FIG. 7A is a sectional view showing a structure example of a joining portion between a battery can and a battery lid in a third embodiment, which shows a cross section before welding.
Figure 7B:
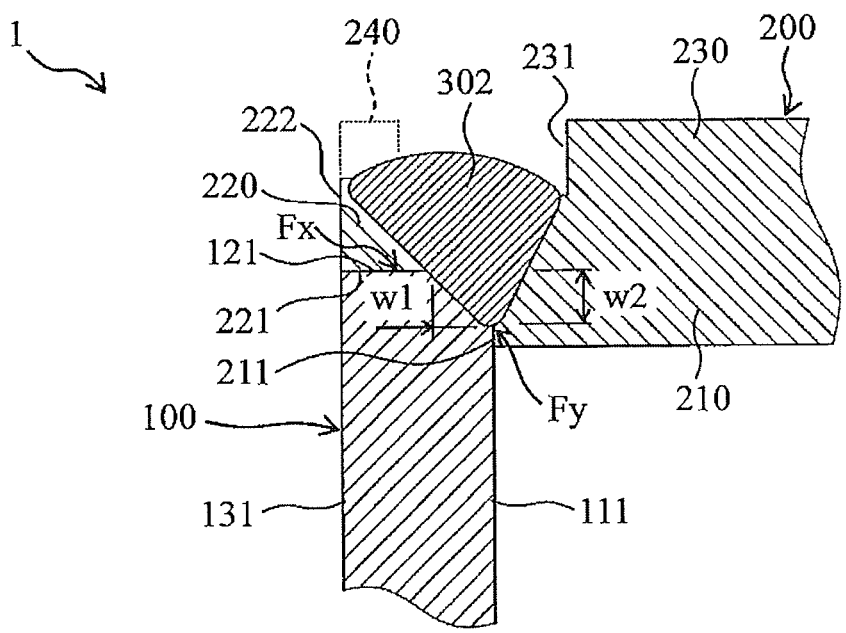
FIG. 7B is a sectional view showing a structure example of the joining portion between the battery can and the battery lid in the third embodiment, which shows a cross section after welding.

Next, a third embodiment of a square battery of the present invention will be described with reference to FIG. 7A and FIG. 7B. FIG. 7A and FIG. 7B are sectional views showing a structure example of a joining portion between a battery can and a battery lid in the third embodiment, FIG. 7A showing a cross section before welding and FIG. 7B showing a cross section after welding. The same components as those of the above-described embodiments are indicated by the same reference numerals to omit detailed description thereof.

The present embodiment is characterized in that a protrusion portion 240 is provided in an outer circumference end portion of a flange portion 220 which will be melted by irradiation of the laser EB to be a melting allowance. The protrusion portion 240 is integrally formed when press-molding a battery lid 200. The protrusion portion 240 protrudes upward from the flange portion 220 in the same direction of an upper projection portion 230 and is continuously provided along an outer circumference of the battery lid 200 over the entire circumference. Then, in the present embodiment, the protrusion portion protrudes as high as the upper projection portion 230 and has a lateral width smaller than a plate thickness of a battery can 100.

The protrusion portion 240 is arranged at the side of a part of the flange portion 220 irradiated with the laser EB and is melted by the irradiation of the laser EB. The laser EB is radiated from above the battery lid 200 toward a corner K1 as a point of intersection between a lateral boundary surface Fx and a vertical boundary surface Fy to simultaneously melt both a depth direction along the irradiation direction of the laser EB and a width direction crossing the irradiation direction, thereby forming a welding portion 302 which welds a space between the battery lid 200 and the battery can 100.

The protrusion portion 240 is melted by the laser EB to serve as a welding supplemental metal of the welding portion 302. As illustrated in FIG. 7B, the welding portion 302 has its volume increased by the volume of the protrusion portion 240 melted, thereby reducing a cooling speed and easing a stress exerted at the time of solidification and shrinkage after welding. Therefore, cracking and the like of the welding portion 302 can be effectively prevented to obtain high welding quality.

Fourth Embodiment

Figure 8A:
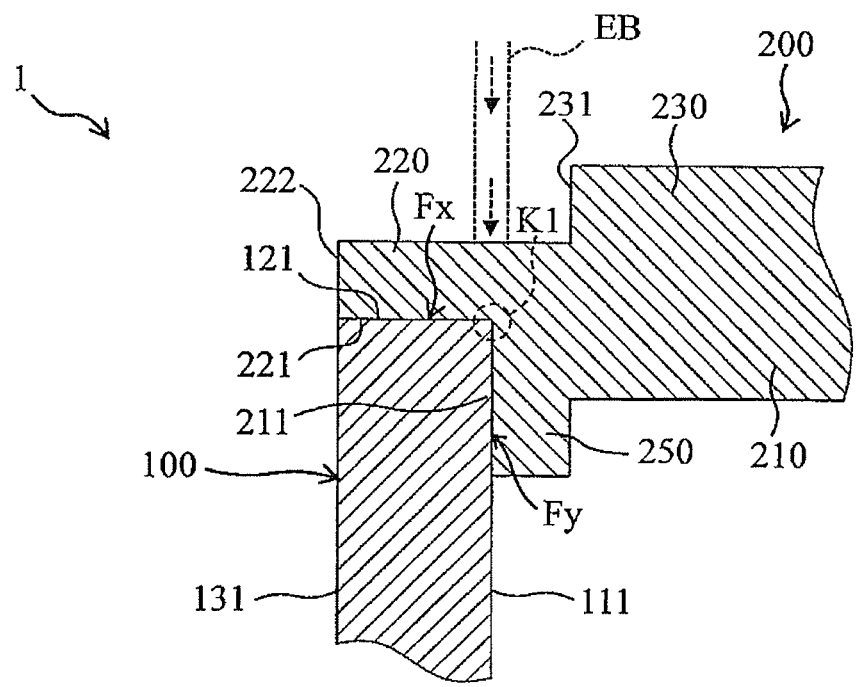
FIG. 8A is a sectional view showing a structure example of a joining portion between a battery can and a battery lid in a fourth embodiment, which shows a cross section before welding.
Figure 8B:
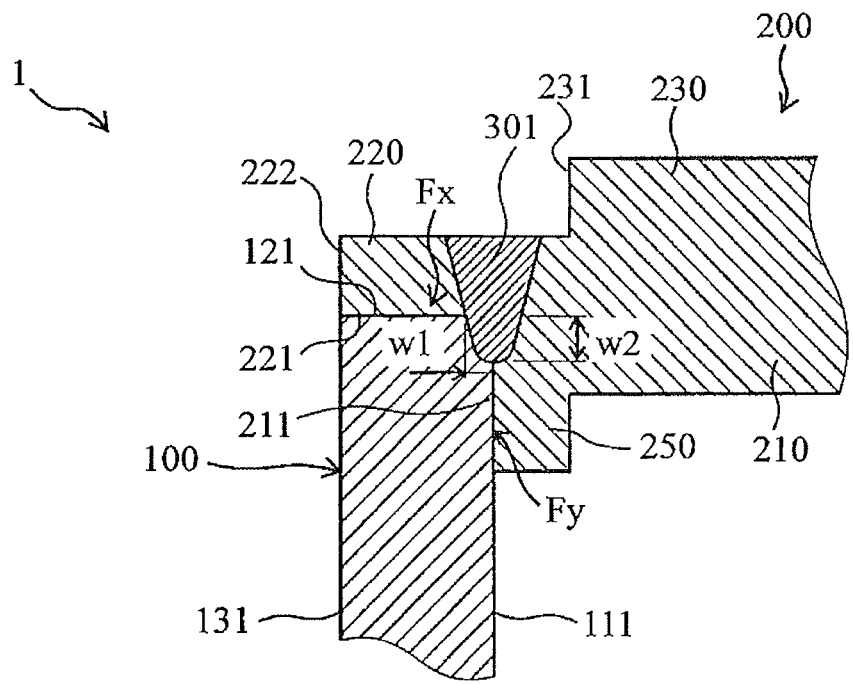
FIG. 8B is a sectional view showing a structure example of the joining portion between the battery can and the battery lid in the fourth embodiment, which shows a cross section after welding.

Next, a fourth embodiment of a square battery of the present invention will be described with reference to FIG. 8A and FIG. 8B. FIG. 8A and FIG. 8B are sectional views showing a structure example of a joining portion between a battery can and a battery lid in the fourth embodiment, FIG. 8A showing a cross section before welding and FIG. 8B showing a cross section after welding. The same components as those of the above-described embodiments are indicated by the same reference numerals to omit detailed description thereof.

The present embodiment is characterized in that a rib portion 250 is provided in a lower projection portion 210 of a battery lid 200.

The rib portion 250 is integrally formed when press-molding the battery lid 200. The rib portion 250 is provided along an outer circumference end portion of the lower projection portion 210 over the entire circumference so as to protrude downward from the lower projection portion 210 and to be opposed to an inner wall surface 111 of a battery can 100. A lid stepped surface 211 between the lower projection portion 210 and a flange portion 220 can be extended to below the lower projection portion 210 by the rib portion 250 to extend a vertical boundary surface Fy downward and longer the distance thereof, so that the lid stepped surface 211 is allowed to be opposed to the inner wall surface 111 of the battery can 100 over a wider area.

Therefore, it is possible to extend a welding height w2 to increase a resistance to a force in a shearing direction exerted on the vertical boundary surface Fy more. It is also possible to increase a distance of the vertical boundary surface Fy below a welding portion 301 to catch welding metal (spatters) between the inner wall surface 111 of the battery can 100 and the lid stepped surface 211 of the battery lid 200 at the time of welding the welding portion 301 and prevent the spatters from entering the inside of a battery container, thereby enabling assembly of a higher quality battery.

Fifth Embodiment

Figure 9A:
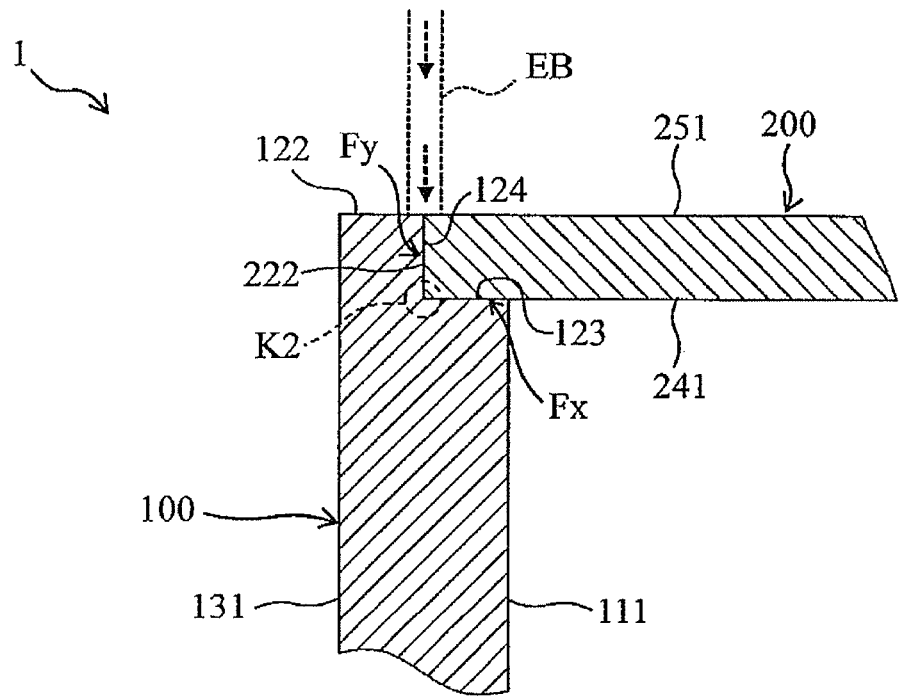
FIG. 9A is a sectional view showing a structure example of a joining portion between a battery can and a battery lid in a fifth embodiment, which shows a cross section before welding.
Figure 9B:
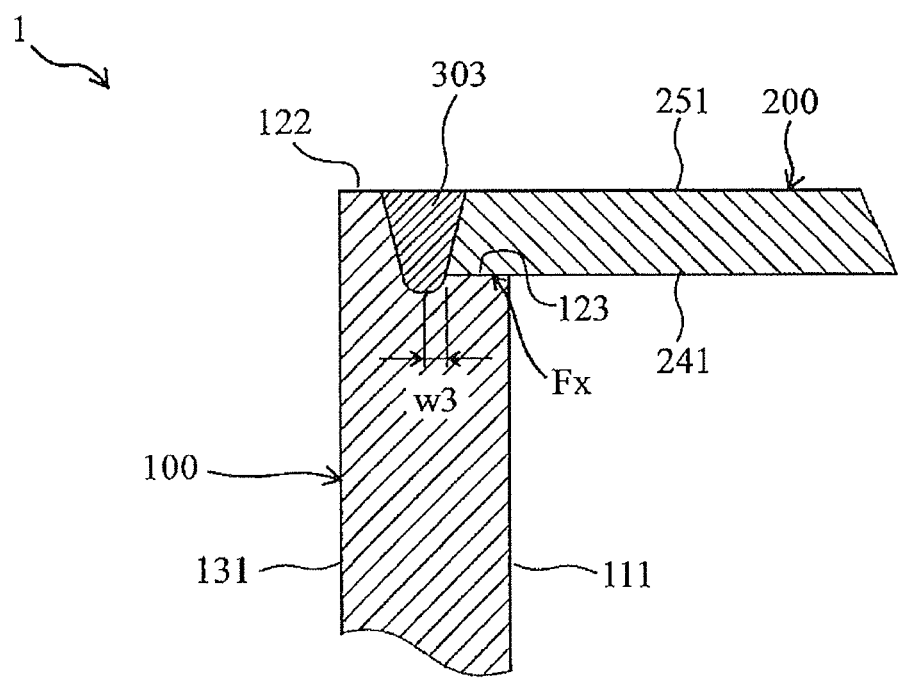
FIG. 9B is a sectional view showing a structure example of the joining portion between the battery can and the battery lid in the fifth embodiment, which shows across section after welding.

Next, a fifth embodiment of a square battery of the present invention will be described with reference to FIG. 9A and FIG. 9B. FIG. 9A and FIG. 9B are sectional views showing a structure example of a joining portion between a battery can and a battery lid in the fifth embodiment, FIG. 9A showing a cross section before welding and FIG. 9B showing a cross section after welding. The same components as those of the above-described embodiments are indicated by the same reference numerals to omit detailed description thereof.

The present embodiment is characterized in that a step is formed in an upper end portion of a battery can 100, and a battery lid 200 is fit in the step to laser weld two boundary surfaces formed between the battery can 100 and the battery lid 200.

The battery can 100 has, in the upper end portion thereof, an upper stage end surface 122, a lower stage end surface 123 and a can stepped surface 124. The upper stage end surface 122 and the lower stage end surface 123 are formed in a lateral direction orthogonal to (crossing) a height direction of a side wall portion of the battery can 100. The upper stage end surface 122 is provided on the side of an outer wall surface 131 in the upper end portion of the battery can 100, and the lower stage end surface 123 is provided on the side of a lower end portion of the battery can 100 rather than the upper stage end surface 122 and on the side of the inner wall surface 111 of the battery can 100. The can stepped surface 124 is interposed between the upper stage end surface 122 and the lower stage end surface 123 and is formed in a vertical direction along the height direction of the side wall portion of the battery can 100. The upper stage end surface 122 and the lower stage end surface 123 are integrally formed when press-molding the battery can 100. The upper stage end surface 122 and the lower stage end surface 123 are continuously formed along the upper end portion of the battery can 100 over the entire circumference.

Placing the battery lid 200 on the battery can 100 blocks an opening portion 100d of the battery can 100 to bring a lower surface 241 into contact with the lower stage end surface 123 of the battery can 100, so that an outer circumference end surface 222 opposes the can stepped surface 124 of the battery can 100. Therefore, between the lower stage end surface 123 of the battery can 100 and the lower surface 241 of the battery lid 200, a lateral boundary surface Fx is formed, and between the can stepped surface 124 of the battery can 100 and the outer circumference end surface 222 of the battery lid 200, a vertical boundary surface Fy is formed. Specifically, the lower surface 241 of the battery lid 200 opposes the lower stage end surface 123 of the battery can 100 to configure a first opposed surface which forms the lateral boundary surface Fx, and the outer circumference end surface 222 of the battery lid 200 intersects the first opposed surface to oppose the can stepped surface 124, thereby configuring a second opposed surface which forms the vertical boundary surface Fy. The lateral boundary surface Fx and the vertical boundary surface Fy are orthogonal to each other to cross at a corner K2 to have an L-shaped cross section and are continuously formed along an outer circumference of the battery lid 200 over the entire circumference.

The battery lid 200 is welded to the battery can 100 by the laser EB to hermetically seal the opening portion 100d. As illustrated in FIG. 9A, the laser EB is radiated, from above the battery lid 200, in the vertical direction along the height direction of the side wall portion of the battery can 100 to weld at least a part of the lateral boundary surface Fx and at least a part of the vertical boundary surface Fy.

The laser EB is radiated, from above the battery lid 200, along the vertical boundary surface Fy toward the corner K2 at which the vertical boundary surface Fy and the lateral boundary surface Fx intersect. Then, a welding portion 303 is formed which welds a space between the battery lid 200 and the battery can 100 by simultaneously melting both a depth direction along the irradiation direction of the laser EB and a width direction crossing the irradiation direction. The laser EB is radiated with respect to the outer wall surface 131 of the battery can 100.

The welding portion 303 is provided to include the corner K1 at which the lateral boundary surface Fx and the vertical boundary surface Fy intersect, thereby hermetically sealing a space between the battery can 100 and the battery lid 200. The welding portion 303 is formed by melting the battery lid 200 from the upper surface of the battery lid 200 to a position deeper than the corner K2 to join the lateral boundary surface Fx by a welding width w3 and entirely join the vertical boundary surface Fy over the vertical direction.

Specifically, the lateral boundary surface Fx is partly welded from the corner K2 by the prescribed welding width w3 and the vertical boundary surface Fy is entirely welded in the vertical direction. The welding portion 301 is continuously provided along the vertical boundary surface Fy over the entire circumference.

According to the above-described square battery 1, since both the lateral boundary surface Fx and the vertical boundary surface Fy are welded, as compared with a case where only either one of the lateral boundary surface Fx and the vertical boundary surface Fy is welded, both a force exerted on the height direction and a force exerted on the lateral direction can be resisted to obtain a high welding strength.

In particular, although due to an increase in an internal pressure or the like, the square battery 1 is deformed in a direction where a battery container expands, thereby exerting a force in a direction in which an outer circumference portion of the battery lid 200 is removed from the lower stage end surface 123 of the battery can 100, i.e., a force in a tensile direction in which the lateral boundary surface Fx is removed, the welding portion 303 welds, in addition to the lateral boundary surface Fx, the vertical boundary surface Fy extending in a direction orthogonal to the lateral boundary surface Fx. Therefore, a force in a shearing direction is exerted between the battery lid 200 and the battery can 100 to resist the force in the direction in which the battery lid 200 is removed, thereby obtaining a high welding strength.

In the square battery 1, the welding width w3 of the welding portion 301 on the lateral boundary surface Fx is shorter than the lower stage end surface 123 of the battery can 100, and at an inner side of the battery container than the welding portion 303, a part is formed in which the lower stage end surface 123 of the battery can 100 and the lower surface 241 of the battery lid 200 are opposed to each other. Therefore, spatters generated at the time of laser EB irradiation can be caught by the opposed part to prevent the spatters from entering the inside of the battery container.

Sixth Embodiment

Figure 10A:
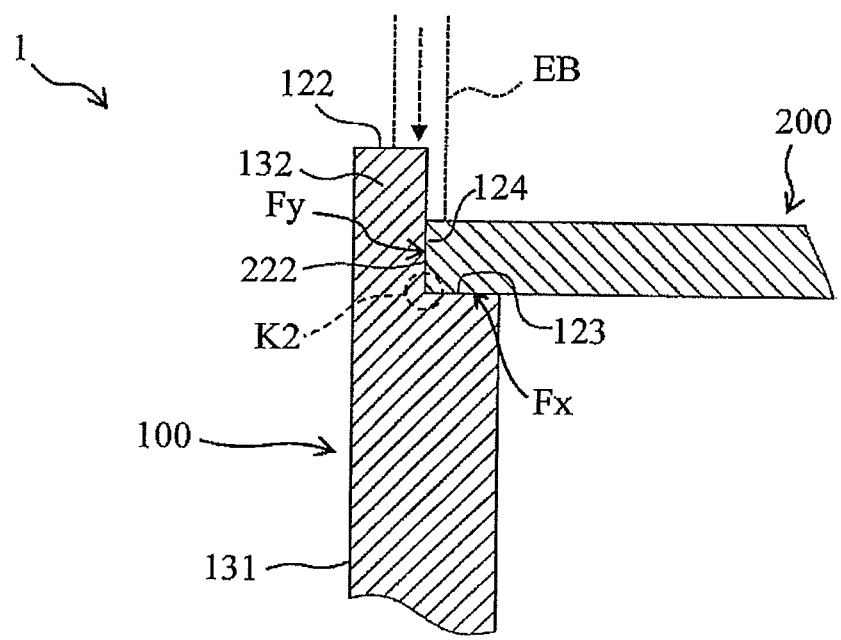
FIG. 10A is a sectional view showing a structure example of a joining portion between a battery can and a battery lid in a sixth embodiment, which shows a cross section before welding.
Figure 10B:
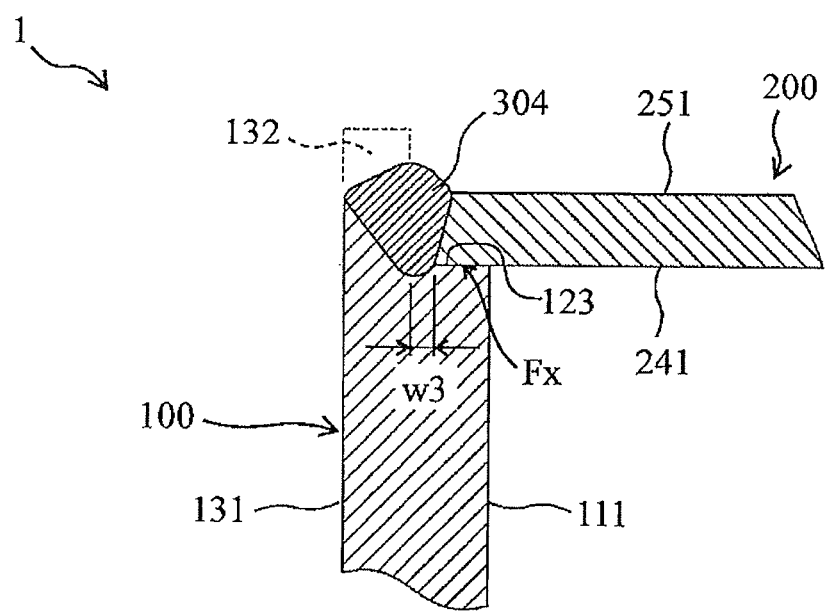
FIG. 10B is a sectional view showing a structure example of the joining portion between the battery can and the battery lid in the sixth embodiment, which shows a cross section after welding.

Next, a sixth embodiment of a square battery of the present invention will be described with reference to FIG. 10A and FIG. 10B. FIG. 10A and FIG. 10B are sectional views showing a structure example of a joining portion between a battery can and a battery lid in the sixth embodiment, FIG. 10A showing a cross section before welding and FIG. 10B showing a cross section after welding. The same components as those of the above-described embodiments are indicated by the same reference numerals to omit detailed description thereof.

The present embodiment is characterized in that either one of a can stepped surface 124 of a battery can 100 and an outer circumference end surface 222 of a battery lid 200 is higher in a vertical direction and the one with a larger height is partly melted by the irradiation of the laser EB and assumed to be a melting allowance.

A height of the can stepped surface 124 of the battery can 100 is larger than a thickness of the battery lid 200, and in an upper end portion of the battery lid 200, a protrusion portion 132 is provided which is located above an upper surface 251 of the battery lid 200. The protrusion portion 132 is integrally formed when press-molding the battery can 100. The protrusion portion 132 is continuously provided along an outer edge of an opening portion 100d of the battery can 100 over the entire circumference.

The battery lid 200 is welded to the battery can 110 by the irradiation of the laser EB to seal the opening portion 100d. The laser EB is radiated from above the battery lid 200 toward a corner K2 along a vertical boundary surface Fy to simultaneously melt both a depth direction along the laser EB irradiation direction and a width direction crossing the irradiation direction, thereby forming a welding portion 304 which welds a space between the battery lid 200 and the battery can 100.

The protrusion portion 132 is melted by the laser EB to serve as a welding supplemental metal of the welding portion 304. As illustrated in FIG. 10B, the welding portion 304 has its volume increased by the volume of the protrusion portion 132 melted, thereby easing a stress exerted at the time of solidification and shrinkage after welding. Therefore, cracking and the like of the welding portion 302 can be effectively prevented to perform high quality welding.

Seventh Embodiment

Figure 11A:
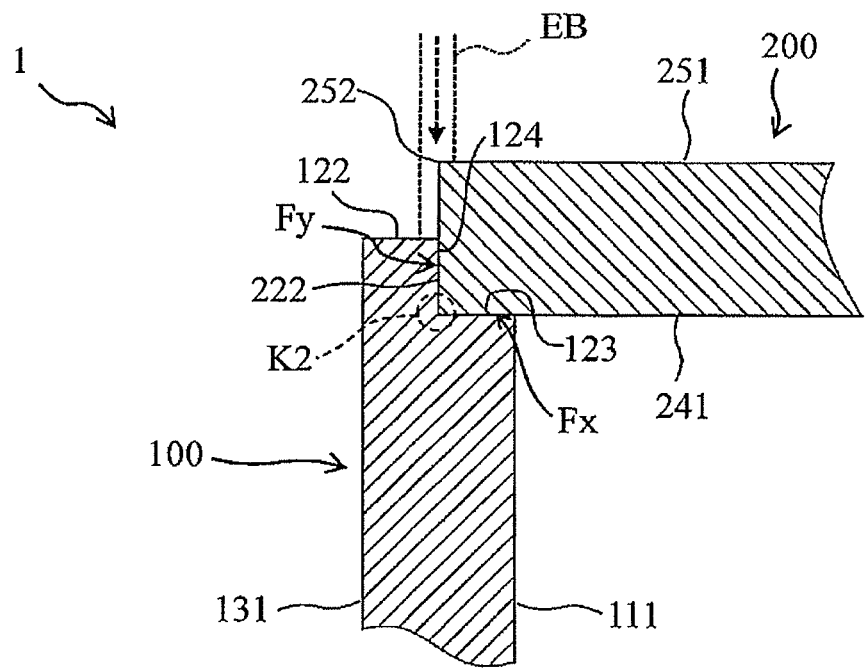
FIG. 11A is a sectional view showing a structure example of a joining portion between a battery can and a battery lid in a seventh embodiment, which shows a cross section before welding.
Figure 11B:
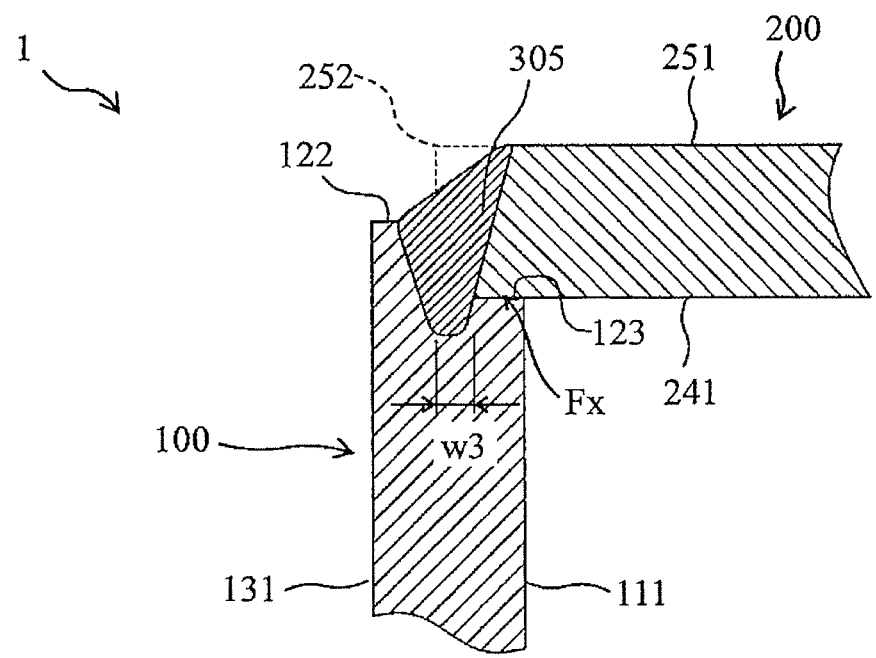
FIG. 11B is a sectional view showing a structure example of the joining portion between the battery can and the battery lid in the seventh embodiment, which shows a cross section after welding.

Next, a seventh embodiment of a square battery of the present invention will be described with reference to FIG. 11A and FIG. 11B. FIG. 11A and FIG. 11B are sectional views showing a structure example of a joining portion between a battery can and a battery lid in the seventh embodiment, FIG. 11A showing a cross section before welding and FIG. 11B showing a cross section after welding. The same components as those of the above-described embodiments are indicated by the same reference numerals to omit detailed description thereof.

The present embodiment is characterized, similarly to the above-described sixth embodiment, in that either one of a can stepped surface 124 of a battery can 100 and an outer circumference end surface 222 of a battery lid 200 is higher in a vertical direction and the one with a larger height is partly melted by the irradiation of the laser EB and assumed to be a melting allowance.

A height of the can stepped surface 124 of the battery can 100 is smaller than a thickness of the battery lid 200.

The thickness of the battery lid 200 is larger than the height of the can stepped surface 124 of the battery can 100, and an upper edge portion 252 of an outer circumference portion of the battery lid 200 is exposed at a position above an upper stage end surface 122 of the battery can 100.

The battery lid 200 is welded to the battery can 110 by the irradiation of the laser EB to seal an opening portion 100d. The laser EB is radiated from above the battery lid 200 toward a corner K2 along a vertical boundary surface Fy to simultaneously melt both a depth direction along an irradiation direction of the laser EB and a width direction crossing the irradiation direction, thereby forming a welding portion 305 which welds a space the battery lid 200 and the battery can 100.

An upper edge portion 252 of the outer circumference portion of the battery lid 200 is melted by the laser EB to serve as a welding supplemental metal of the welding portion 305. As illustrated in FIG. 11B, the welding portion 305 has its volume increased by the volume of the upper edge portion 252 melted, thereby easing a stress exerted at the time of solidification and shrinkage after welding. Therefore, cracking and the like of the welding portion 302 can be effectively prevented to obtain high welding quality.

Eighth Embodiment

Figure 12A:
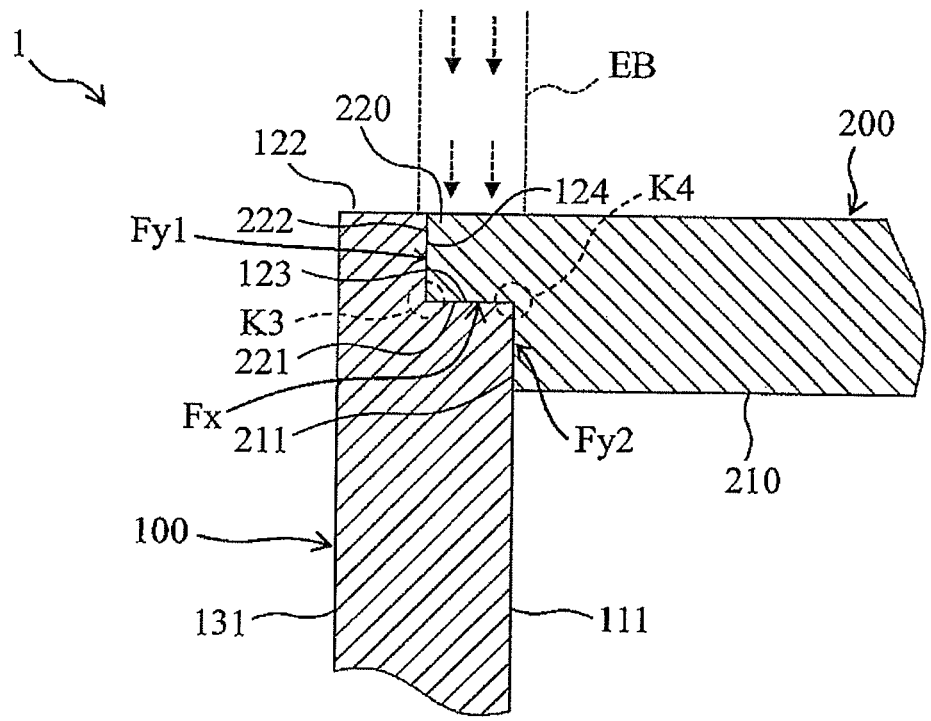
FIG. 12A is a sectional view showing a structure example of a joining portion between a battery can and a battery lid in an eighth embodiment, which shows a cross section before welding.
Figure 12B:
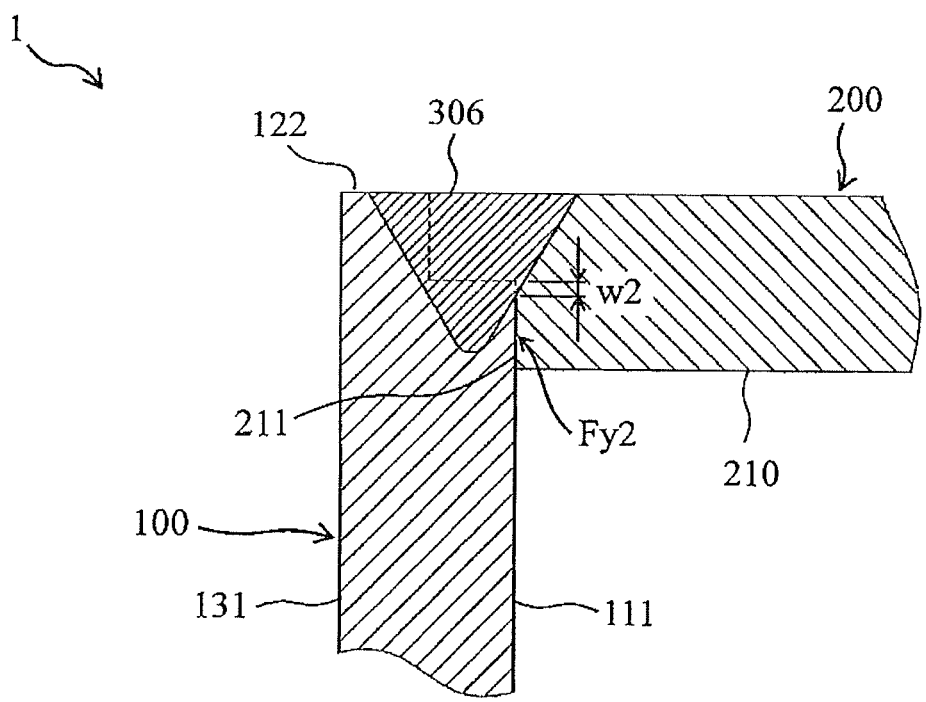
FIG. 12B is a sectional view showing a structure example of the joining portion between the battery can and the battery lid in the eighth embodiment, which shows a cross section after welding.

Next, an eighth embodiment of a square battery of the present invention will be described with reference to FIG. 12A and FIG. 12B. FIG. 12A and FIG. 12B are sectional views showing a structure example of a joining portion between a battery can and a battery lid in the eighth embodiment, FIG. 12A showing a cross section before welding and FIG. 12B showing a cross section after welding. The same components as those of the above-described embodiments are indicated by the same reference numerals to omit detailed description thereof.

The present embodiment is characterized in that an upper end portion of a battery can 100 and an outer circumference end portion of a battery lid 200 are provided with steps to be combined, and a plurality of boundary surfaces formed between the battery can 100 and the battery lid 200 are laser welded.

The battery can 100 has an upper stage end surface 122 in a lateral direction orthogonal to (crossing) a height direction of a side wall portion, which surface is located in the upper end portion of the battery can 100, a lower stage end surface 123 in the lateral direction formed on the side of a lower end portion of the battery can 100 rather than the upper stage end surface 122 and at an inner side of the battery can 100, and a can stepped surface 124 in a vertical direction along the height direction of the side wall portion, which surface is interposed between the upper stage end surface 122 and the lower stage end surface 123.

The battery lid 200 has a lower surface (first opposed surface) 221 of a flange portion 220 which forms a lateral boundary surface Fx opposed to the lower stage end surface 123 of the battery can 100, an outer circumference end surface (second opposed surface) 222 forming a first vertical boundary surface Fy1 orthogonal to the lower surface 221 of the flange portion 220 and opposed to the can stepped surface 124 of the battery can 100, and a lid stepped surface (third opposed surface) 211 forming a second vertical boundary surface Fy2 orthogonal to the lower surface 221 of the flange portion 220 and opposed to an inner wall surface 111 of the battery can 100.

Placing the battery lid 200 on the battery can 100 blocks an opening portion 100d of the battery can 100 to bring the lower surface 221 of the flange portion 220 into contact with the lower stage end surface 123 of the battery can 100, so that the outer circumference end surface 222 opposes the can stepped surface 124 of the battery can 100 as illustrated in FIG. 12A. Then, the lid stepped surface 211 of the battery lid 200 opposes the inner wall surface 111 of the battery can 100.

Therefore, the first vertical boundary surface Fy1 is formed between the can stepped surface 124 of the battery can 100 and the outer circumference end surface 222 of the battery lid 200, the lateral boundary surface Fx is formed between the lower stage end surface 123 of the battery can 100 and the flange portion 220 of the battery lid 200, and further, the second vertical boundary surface Fy2 is formed between the inner wall surface 111 of the battery can 100 and the lid stepped surface 211 of the battery lid 200.

The first vertical boundary surface Fy1 and the second lateral boundary surface Fx are orthogonal to each other to cross at a corner K3, and the lateral boundary surface Fx and the second vertical boundary surface Fy2 are orthogonal to each other to cross at a corner K4 to have a cross section of the entire boundary surface be crank-shaped, which is formed continuously along an outer circumference of the battery lid 200 over the entire circumference.

The battery lid 200 is welded to the battery can 100 by the laser EB to hermetically seal the opening portion 100d. As illustrated in FIG. 12A, the laser EB is radiated from above the battery lid 200 toward the corners K3 and K4 so as to cover a width including the vertical boundary surfaces Fy1 and Fy2, thereby simultaneously melting both a depth direction along the irradiation direction of the laser EB and a width direction crossing the irradiation direction to form a welding portion 306 which welds a space between the battery lid 200 and the battery can 100.

The welding portion 306 hermetically seals the space between the battery can 100 and the battery lid 200. The welding portion 306 is melted to be formed from an upper surface of the battery lid 200 to a position deeper than the corners K3 and K4, thereby joining the first vertical boundary surface Fy1 over the height direction, joining the lateral boundary surface Fx over the lateral direction and joining the second vertical boundary surface Fy2 by a welding height w2.

According to the square battery 1, since three boundary surfaces are welded, as compared with a case where only one of the boundary surfaces is welded, both a force exerted on the height direction and a force exerted on the lateral direction can be resisted to obtain a high welding strength.

The present invention is not limited to the contents of the above-described respective embodiments and various modifications can be made without departing from the spirit of the present invention. For example, although the eighth embodiment has been described with respect to a case where three boundary surfaces are welded as an example, a space may be welded between either one of the vertical boundary surfaces Fy1 and Fy2 and the lateral boundary surface Fx to obtain a high welding strength.

Other than those described, the structures, as shown in the second to fourth examples, in which the upper projection portion 230 is provided on the surface of the battery lid 200, in which the protrusion portion 240 is provided in the battery lid 200 as a melting allowance, and in which the rib portion 250 is provided in the battery lid 200, are also applicable to the structures shown in the fifth to seventh embodiments.

These structures include not only the effects shown respectively but also the following effects. Since at the time of laser welding, laser irradiation from the side of the battery lid located on the outer side prevents melted metal from carelessly flowing outside the opening portion of the battery can, precision in dimension of the battery can as a finished product can be increased, so that when the battery can is used while being bound by a holder or the like, the can be bound at a flat surface without caring about the melted metal portion being welded.

The present invention is a square battery including a flat wound group formed by binding a positive electrode, a negative electrode and a separator so as to be flat-shaped; a flat battery can of a rectangular solid shape which houses the flat wound group, has one end portion provided with an opening portion, the other end portion blocked, and a side surface formed with a wide side surface and a narrow side surface; and a battery lid which has an engagement portion to be engaged with an end surface of the side surface of the battery can and which is to be sealed by welding the opening portion of the battery can, wherein an upper surface of the battery lid has a welding portion, the engagement portion of the battery lid engages at two surfaces which at least cross an end surface of the side surface of the battery can in a cross section in a thickness direction, and the engagement portion has a melting portion on the two crossing surfaces, and other modes within the scope of the technical spirit of the square battery are included in the scope of the present invention.

Although the present invention has been described with respect to the embodiments in the foregoing, the present invention is not limited to the above-described embodiments and various design modifications may be made without departing from the spirit of the present invention recited in the claims. For example, the above described embodiments have been described in detail for making explanation of the present invention be easy to understand and is not necessarily limited to those including all the configurations described. Additionally, a part of a configuration of a certain embodiment can be replaced by a configuration of other embodiment and alternatively, to a configuration of a certain embodiment, a configuration of other embodiment can be added as well. Further, with respect to a part of a configuration of other embodiment, addition, deletion and replacement of other configuration are also possible.

REFERENCE SIGNS LIST 1 square battery
100 battery can
111 inner wall surface
121 upper end surface
122 upper stage end surface
123 lower stage end surface
124 can stepped surface
200 battery lid
210 lower projection portion
211 lid stepped surface (second opposed surface, third opposed surface)
220 flange portion
221 lower surface (first opposed surface)
222 outer circumference end surface
230 upper projection portion
241 lower surface
301-307 welding portion
Fx lateral boundary surface
Fy vertical boundary surface
EB laser

The invention claimed is:

1. A square battery comprising a battery can surrounded by four side wall portions, and having an upper end portion on one side in a height direction of the side wall portions opened and having a bottom portion in a lower end portion on the other side in the height direction, and a battery lid welded to the upper end portion of the battery can to seal the battery can, wherein between the battery can and the battery lid, a lateral boundary surface in a lateral direction crossing the height direction of the side wall portions and a vertical boundary surface in a vertical direction crossing the lateral boundary surface and along the height direction of the side wall portions are formed, at least a part of the lateral boundary surface and at least a part of the vertical boundary surface being welded by a laser radiated in the vertical direction along the height direction of the side wall portions, the battery can has an upper end surface in the lateral direction crossing the height direction of the side wall portions, the upper end surface being provided at the upper end portion of the battery can, an inner wall surface in the vertical direction along the height direction of the side wall portions, the inner wall surface crossing the upper end surface and being provided inside the battery can, and an outer wall surface in the vertical direction along the height direction of the side wall portions, the outer wall surface being provided on the outer side of the battery can, and the upper end surface being formed bridging over the inner wall surface and the outer wall surface, and the battery lid has a first opposed surface forming the lateral boundary surface so as to be opposed to the upper end surface of the battery can, and a second opposed surface crossing the first opposed surface and opposed to the inner wall surface of the battery can to form the vertical boundary surface, wherein the battery lid has a flange portion provided along an outer circumference portion of the battery lid, and a lower projection portion which protrudes more toward the battery can side than the flange portion and is fit in an opening of the battery can, and a lower surface of the flange portion opposed to the upper end surface of the battery can forms the first opposed surface, and a lid stepped surface forms the second opposed surface, the lid stepped surface being interposed between the flange portion and the lower projection portion and opposed to the side wall portion of the battery can, and wherein the lateral boundary surface is partly welded from a corner at which the lateral boundary surface and the vertical boundary surface cross with each other by a prescribed welding width, and the vertical boundary surface is partly welded from the corner by a prescribed welding depth, and wherein the battery lid has an upper projection portion which protrudes in a thickness direction of the battery lid rather than the flange portion and toward a side separating from the battery can.

2. The square battery according to claim 1, wherein the battery lid has a protrusion portion which protrudes in the same direction as the upper projection portion from the flange portion and is melted by the laser.

3. The square battery according to claim 1, wherein the battery lid has a rib portion which protrudes from the lower projection portion and is opposed to the side wall portion of the battery can.

\* \* \* \* \*